US007024620B2

United States Patent
Ponce et al.

(10) Patent No.: US 7,024,620 B2
(45) Date of Patent: Apr. 4, 2006

(54) POINT-OF-NEED DOCUMENT PRODUCTION SYSTEM AND METHOD

(75) Inventors: Rafael Antonio Martinez Ponce, Jalisco (MX); Alejandro Wiechers, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 716 days.

(21) Appl. No.: 10/093,627

(22) Filed: Mar. 8, 2002

(65) Prior Publication Data

US 2003/0172057 A1 Sep. 11, 2003

(51) Int. Cl.
*G06F 17/00* (2006.01)
(52) U.S. Cl. .................... 715/507; 715/523
(58) Field of Classification Search ............ 715/513, 715/507, 540, 508, 523
See application file for complete search history.

(56) References Cited

U.S. PATENT DOCUMENTS

| | | | | |
|---|---|---|---|---|
| 5,267,155 | A * | 11/1993 | Buchanan et al. | 715/540 |
| 5,465,213 | A | 11/1995 | Ross | 700/117 |
| 5,893,914 | A * | 4/1999 | Clapp | 715/507 |
| 6,011,758 | A | 1/2000 | Dockes et al. | 707/104.1 |
| 6,012,890 | A | 1/2000 | Celorio Garrido | 412/19 |
| 6,507,856 | B1 * | 1/2003 | Chen et al. | 715/513 |
| 6,907,564 | B1 * | 6/2005 | Burchhardt et al. | 715/513 |

* cited by examiner

*Primary Examiner*—Sanjiv Shah (57) ABSTRACT

A method of producing a document for a customer at a point-of-need includes selecting an intelligent template for the document from the point-of-need, merging data of the customer with the intelligent template for the document to create an intelligent document, and producing the document for the customer at the point-of-need based on the intelligent document.

20 Claims, 6 Drawing Sheets

POINT-OF-NEED DOCUMENT PRODUCTION SYSTEM AND METHOD

CROSS-REFERENCE TO RELATED APPLICATIONS

This patent application is related to Non-Provisional U.S. patent application Ser. No. 10/096,122, entitled "CUSTOMIZED DOCUMENT PRODUCTION SYSTEM AND METHOD", filed on even date herewith, assigned to the assignee of the present invention, and incorporated herein by reference.

THE FIELD OF THE INVENTION

The present invention relates generally to document production, and more particularly to production of a document at a point-of-need.

BACKGROUND OF THE INVENTION

Typically, creation, production, and distribution of customized documents is often logistically complex, lengthy, expensive, and, in many instances, not feasible for small runs. As such, published documents such as marketing material or communications, for example, are created so as to appeal to large audiences of customers, produced in high volume runs for economies of scale, and widely distributed for ease of dissemination. Such approach, however, results in marketing material or communications which are often too general and/or untargeted for specific customers. For example, while only certain portions or sections of the marketing material or communication may be relevant to a customer, the customer must possess the entire document. Unfortunately, a user of the marketing material or communication, such as a sales representative interacting with the customer, is unable to customize and/or personalize the marketing material or communication for the customer.

Accordingly, a need exists for producing customized and/or personalized documents for a user and/or a customer at a point-of-need.

SUMMARY OF THE INVENTION

One aspect of the present invention provides a method of producing a document for a customer at a point-of-need. The method includes selecting an intelligent template for the document from the point-of-need, merging data of the customer with the intelligent template for the document to create an intelligent document, and producing the document for the customer at the point-of-need based on the intelligent document.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
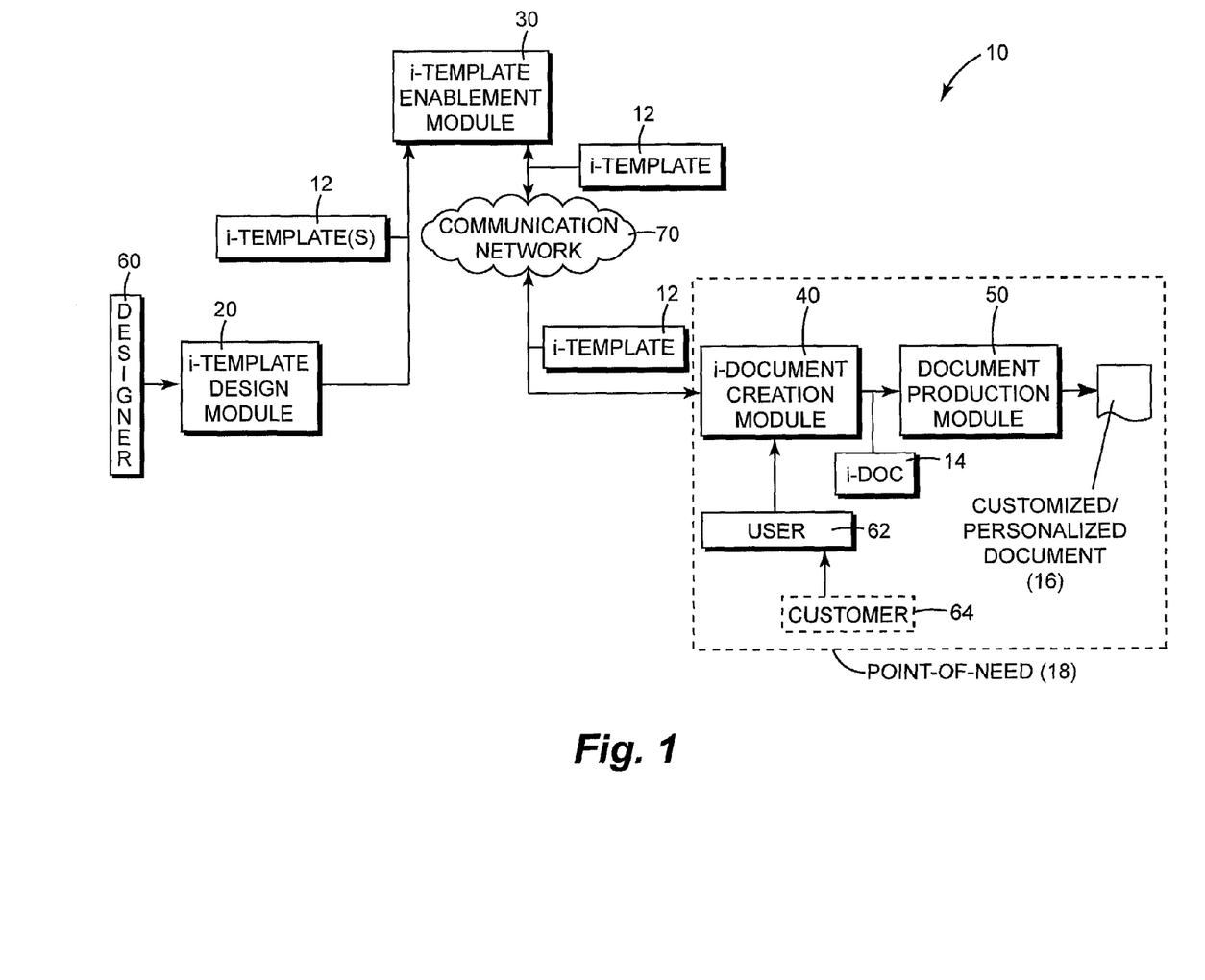
FIG. 1 is a block diagram illustrating one exemplary embodiment of a document production system according to the present invention.

A document production system according to the present invention is illustrated generally at 10 in FIG. 1. Document production system 10 facilitates design of one or more intelligent templates 12, creation of an intelligent document 14 based on one of the intelligent templates 12, and production of a customized and/or personalized document 16 from intelligent document 14, as described in detail below. For clarity, intelligent template 12 and intelligent document 14 are referred to, hereinafter, as i-template 12 and i-doc 14, respectively.

In one exemplary embodiment, document production system 10 includes an intelligent template design module 20, an intelligent template enablement module 30, an intelligent document creation module 40, and a document production module 50. Intelligent template design module 20 facilitates design of i-template 12 and intelligent template enablement module 30 enables use of i-template 12. As such, intelligent document creation module 40 facilitates retrieval of i-template 12 from intelligent template enablement module 30 and creation of i-doc 14 based on i-template 12. Thus, document production module 50 produces customized/personalized document 16 based on i-doc 14. For clarity, intelligent template design module 20, intelligent template enablement module 30, and intelligent document creation module 40 are referred to, hereinafter, as i-template design module 20, i-template enablement module 30, and i-document creation module 40, respectively.

In one exemplary embodiment, a designer 60 interacts with i-template design module 20 to design one or more i-templates 12. As such, i-templates 12 are enabled so as to be available for use by, for example, a user 62 of document production system 10 to create i-doc 14 which, in turn, is used to create customized/personalized document 16, as described in detail below. To enable use of i-templates 12 by user 62, i-templates 12 are registered with i-template enablement module 30. As such, i-template enablement module 30 enables use of i-templates 12 by managing and maintaining i-templates 12 and forwarding i-templates 12 to i-document creation module 40, as described in detail below. Thus, i-template design module 20 facilitates design of one or more i-templates 12 for customized/personalized document 16.

In one exemplary embodiment, user 62 interacts with i-document creation module 40 to create i-doc 14 on behalf of and/or for a customer 64 requesting or desiring customized/personalized document 16. It is, however, within the scope of the present invention for customer 64 to directly interact with i-document creation module 40 to create i-doc 14.

Based on i-doc 14, document production module 50 produces customized/personalized document 16 for user 62 and/or customer 64. More specifically, document production module 50 produces a hard copy and/or an electronic copy of customized/personalized document 16, as described in detail below.

In one exemplary embodiment, creation of i-doc 14 and production of customized/personalized document 16 are performed from and/or at a point-of-need, as defined by dashed line 18. The point-of-need is defined, for example, as a location where customized/personalized document 16 is required. The point-of-need, therefore, includes, for example, a location of user 62 and/or a location of customer 64. As such, i-document creation module 40 and document production module 50 are located at the point-of-need.

In one exemplary embodiment, i-template enablement module 30 and i-document creation module 40 communicate with each other via a communication network 70. Communication network 70, as used herein, is defined to include a local-area network (LAN) and/or a wide-area network (WAN). Communication network 70, therefore, may include an intranet communication network, an Internet communication network, or a similar high-speed communication network including a wireless communication network.

In one exemplary embodiment, i-template enablement module 30 and i-document creation module 40 including, for example, the point-of-need are located remote from each other (i.e., at different locations). Thus, communications between i-template enablement module 30 and i-document creation module 40 are conducted over communication network 70. It is, however, within the scope of the present invention for i-template enablement module 30 and i-document creation module 40 to be located at the same location. Thus, i-template enablement module 30 and i-document creation module 40 may communicate in other manners (e.g., a direct connection or communication link).

Components of document production system 10, including i-template design module 20, i-template enablement module 30, i-document creation module 40, and/or document production module 50, can be implemented in hardware via a microprocessor, programmable logic device, or state machine, in firmware, or in software within a given device. In one exemplary embodiment, at least a portion of software programming for document production system 10 is written in JAVA programming language and each of the main components including, more specifically, i-template enablement module 30 and i-document creation module 40 communicate via communication network 70 using a communication bus protocol. For example, the present invention may or may not use a TCP/IP protocol suite for data transport. Other programming languages and communication bus protocols suitable for use with the present invention will become apparent to those skilled in the art after reading the present application.

Figure 2:
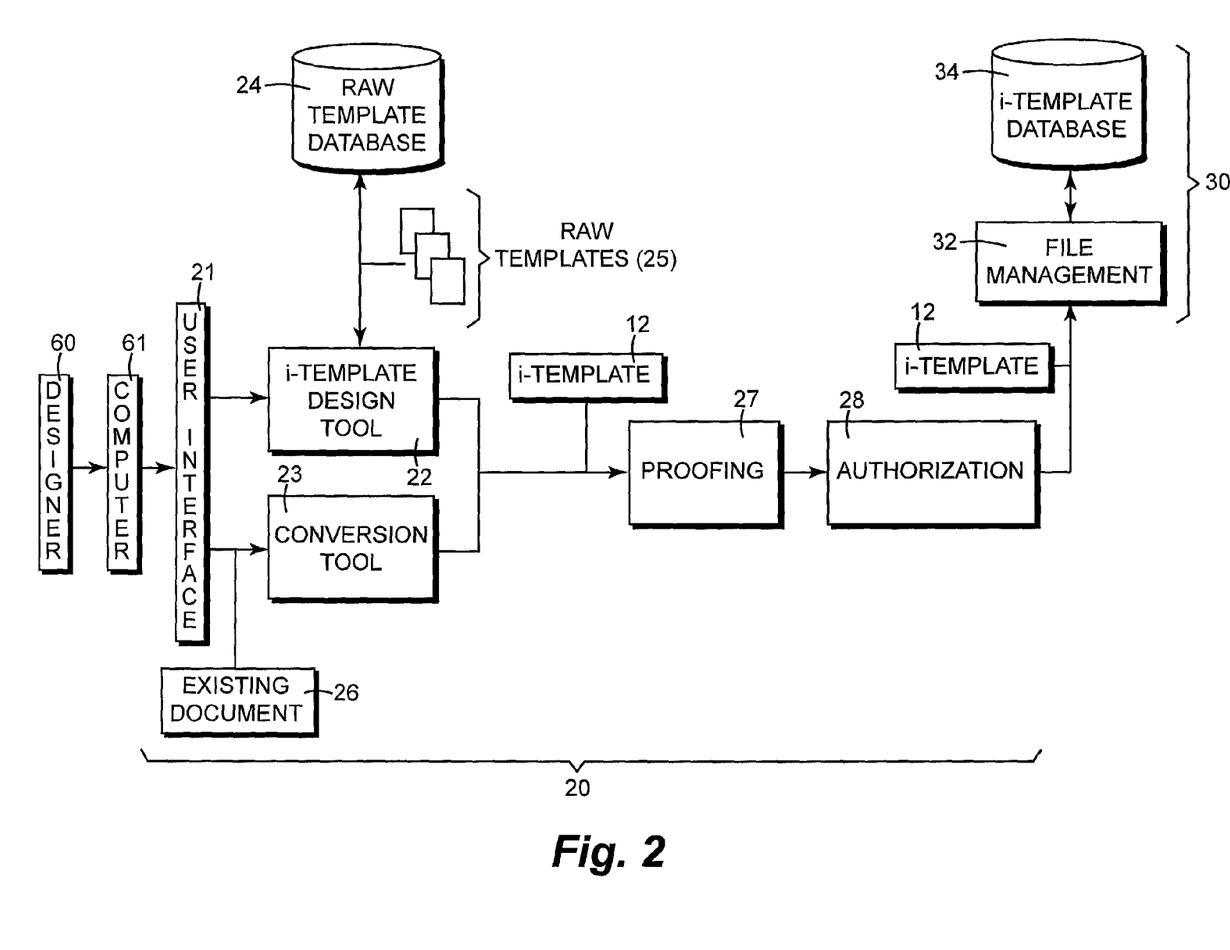
FIG. 2 is a block diagram illustrating one exemplary embodiment of a portion of the document production system of FIG. 1.

As illustrated in FIG. 2, designer 60 interacts with i-template design module 20 via a computer 61. Computer 61 may include, for example, an input device such as a keyboard and/or a mouse, and a display device such as a monitor, as is well known in the art. In addition, computer 61 may be an appliance such as a personal digital assistant (PDA), cellular phone, etc.

In one exemplary embodiment, computer 61 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

Designer 60 interacts with a user interface 21 of i-template design module 20 via computer 61 to create and/or design i-template 12 for customized/personalized document 16 and register i-template 12 with i-template enablement module 30. In one exemplary embodiment, i-template design module 20 includes an i-template design tool 22 and a conversion tool 23. I-template design tool 22 includes, for example, an i-template creation wizard which facilitates creation of i-template 12 by guiding designer 60 through the steps of designing i-template 12.

I-template design tool 22 communicates with a raw template database 24 which maintains a plurality of raw templates 25 for use by designer 60 during the creation of i-template 12. Examples of raw template database 24 include non-volatile memory (e.g., a hard disk drive or other persistent storage device) and may include volatile memory (e.g., random access memory (RAM)). Another example of raw template database 24 includes a relational database management server (RDBMS).

With conversion tool 23, designer 60 can create i-template 12 for customized/personalized document 16 based on an existing document 26. More specifically, conversion tool 23 converts existing document 26 into i-template 12.

In one exemplary embodiment, i-template design module 20 also includes a proofing system 27 and an authorization system 28. With proofing system 27, designer 60 can review and proof i-template 12, including soft and/or hard proofing of i-template 12. At authorization system 28, i-template 12 is reviewed and approved or authorized for use by, for example, designer 60 and/or management of document production system 10.

After creation or design of i-template 12, i-template 12 is registered with i-template enablement module 30. As such, i-template enablement module 30 enables use of i-template 12 by managing and maintaining i-template 12. I-template enablement module 30 enables electronic use or e-enables i-template 12 for use by user 62 via i-document creation module 40, as described below.

In one exemplary embodiment, to manage and maintain i-template 12, i-template enablement module 30 includes a file management system 32 and an i-template database 34. File management system 32 provides file management services for i-template 12, such as security and revision control, as well as access to i-template database 34. I-template database 34 maintains or stores a plurality of i-templates 12 as designed by i-template design module 20. Examples of i-template database 34 include non-volatile memory (e.g., a hard disk drive or other persistent storage device) and may include volatile memory (e.g., random access memory (RAM)). Another example of i-template database 34 includes a relational database management server (RDBMS).

Figure 3:
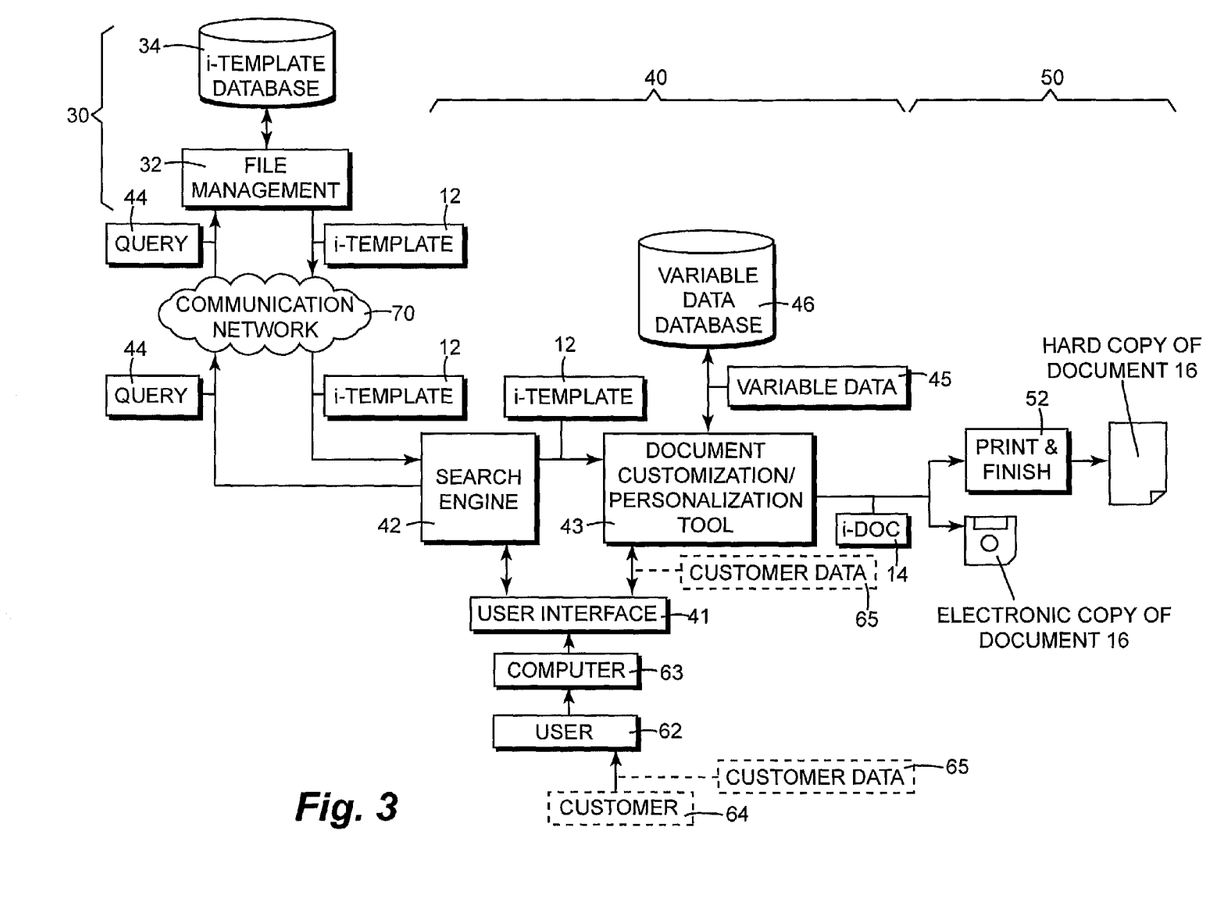
FIG. 3 is a block diagram illustrating one exemplary embodiment of another portion of the document production system of FIG. 1.

As illustrated in FIG. 3, user 62 interacts with i-document creation module 40 via a computer 63. Computer 63 may include, for example, an input device such as a keyboard and/or a mouse, and a display device such as a monitor, as is well known in the art. In addition, computer 61 may be an appliance such as a personal digital assistant (PDA), cellular phone, etc.

In one exemplary embodiment, computer 63 runs an operating system which can support one or more applications. The operating system is stored in memory and executes on a processor. The operating system is preferably a multi-tasking operating system which allows simultaneous execution of multiple applications, although aspects of the present invention may be implemented using a single-tasking operating system.

User 62 interacts with a user interface 41 of i-document creation module 40 via computer 63 to create i-doc 14. In one exemplary embodiment, i-document creation module 40 includes a search engine 42 and a document customization/personalization tool 43. Through search engine 42, user 62 submits a query 44 to i-template enablement module 30 for i-template 12. As such, file management system 32 of i-template enablement module 30 receives and processes query 44. As such, user 62 searches i-template database 34 of i-template enablement module 30 for an appropriate i-template 12 for customized/personalized document 16. Thus, when user 62 identifies or selects i-template 12 for customized/personalized document 16, file management system 32 manages transfer or downloading of i-template 12 to i-document creation module 40. Preferably, user 62 submits query 44 to i-template enablement module 30 and i-template enablement module 30 transfers or downloads i-template 12 to i-document creation module 40 via communication network 70.

With document customization/personalization tool 43, user 62 customizes and/or personalizes i-template 12 to create i-doc 14. In one exemplary embodiment, user 62 customizes and/or personalizes i-template 12 based on customer data 65 of customer 64. User 62 collects customer data 65 from customer 64 at, for example, the point-of-need. Collection of customer data 65 by user 62 includes submission of customer data 65 by customer 64 to user 62. Customer data 65 includes, for example, identification of customer 64, input of customer 64, a specification of customer 64, and/or a selection by customer 64. User 62 may also customize and/or personalize i-template 12 by selecting and/or excluding a specific portion or portions of i-template 12.

In one exemplary embodiment, customer data 65 and other data for creating i-doc 14 form variable data 45 for i-doc 14. Variable data 45 includes, for example, text, an image, and/or a calculation for i-doc 14. As such, document customization/personalization tool 43 merges variable data 45, including customer data 65, with i-template 12 to create i-doc 14.

Variable data 45, including customer data 65, is stored or maintained, for example, by a variable data database 46. Examples of variable data database 46 include non-volatile memory (e.g., a hard disk drive or other persistent storage device) and may include volatile memory (e.g., random access memory (RAM)). Another example of variable data database 46 includes a relational database management server (RDBMS).

In one exemplary embodiment, document customization/personalization tool 43 automatically modifies a format of i-template 12 for creation of i-doc 14. Document customization/personalization tool 43 modifies, for example, a page layout of i-template 12 and/or a font of i-template 12. Document customization/personalization tool 43 modifies the page layout of i-template 12 by modifying, for example, one or more margins of i-template 12, paragraph justification of i-template 12, hyphenation of i-template 12, and/or orientation of i-template 12. Document customization/personalization tool 43 modifies the font of i-template 12 by modifying, for example, a font size of i-template 12, a font style of i-template 12, a font type of i-template 12, and/or font properties of i-template 12. In addition, document customization/personalization tool 43 modifies variable data 45 of i-doc 14. Document customization/personalization tool 43 modifies, for example, size, resolution, and/or orientation of an image for i-doc 14.

Figure 4:
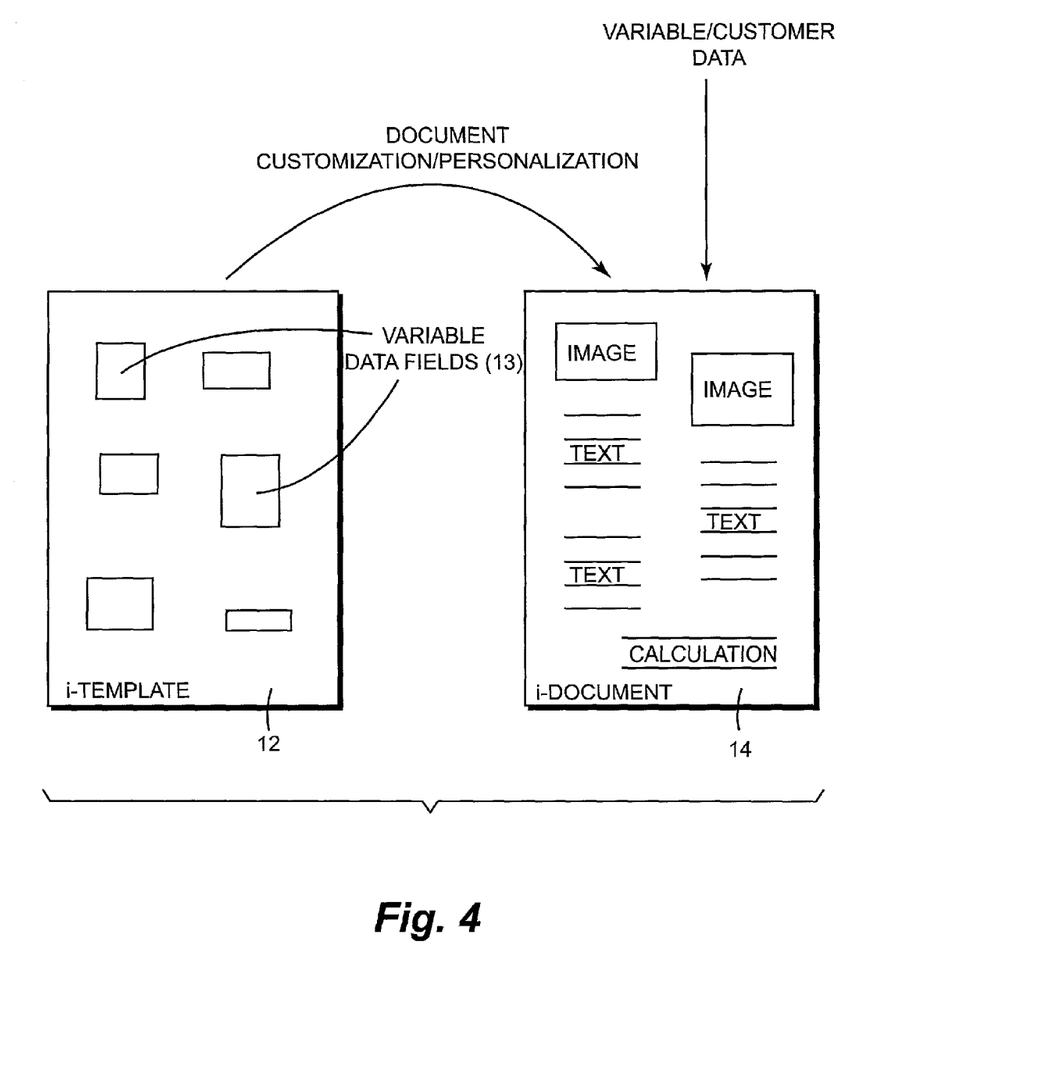
FIG. 4 is a schematic illustration of one exemplary embodiment of an intelligent template and an intelligent document created from the intelligent template according to the present invention.

In one exemplary embodiment, as illustrated in FIG. 4, i-template 12 includes one or more variable data fields 13. As such, i-doc 14 is customized and/or personalized by filling variable data fields 13 with variable data 45, such as customer data 65. More specifically, i-document creation module 40 merges variable data 45, including customer data 65, with i-template 12 to create i-doc 14. Preferably, i-document creation module 40 automatically adjusts variable data fields 13 to accommodate variable data 45 and/or customer data 65.

Returning to FIG. 3, based on i-doc 14, document production module 50 produces customized/personalized document 16. More specifically, document production module 50 produces a printed or hard copy of customized/personalized document 16 and/or an electronic copy of customized/personalized document 16. To produce a hard copy of customized/personalized document 16, document production module 50 includes a printing and finishing system 52. In one exemplary embodiment, printing and finishing system 52 provides, for example, various printing and/or finishing options for customized/personalized document 16 such as single-sided, double-sided, portrait, landscape, stapled, side-stitched, etc.

Figure 5:
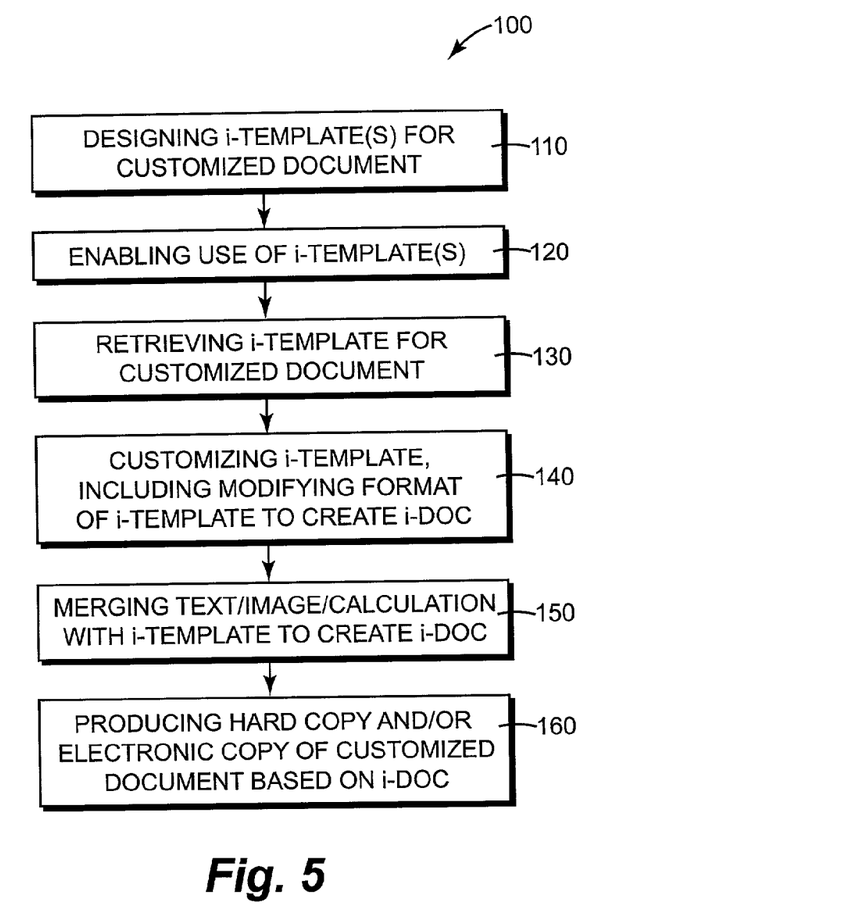
FIG. 5 is a flow diagram illustrating one exemplary embodiment of a method of producing a customized document according to the present invention.

In FIG. 5, a flow diagram illustrating one exemplary embodiment of a method of producing customized/personalized document 16 according to the present invention is illustrated generally at 100. Reference is also made to FIGS. 1–4.

At step 110, one or more i-templates 12 for customized/personalized document 16 are designed. In one exemplary embodiment, i-template 12 is designed, for example, by designer 60 via i-template design module 20. As such, i-template 12 is designed by using i-template design tool 22 or conversion tool 23 of i-template design module 20, as described above with reference to FIG. 2.

At step 120, i-template 12, as designed, for example, with i-template design module 20, is enabled for use. More specifically, i-template 12 is made available electronically or e-enabled by i-template enablement module 30, as described above with reference to FIG. 2.

At step 130, i-template 12 for customized/personalized document 16 is retrieved from i-template enablement module 30. More specifically, user 62 searches and selects i-template 12 from i-template database 34 by using search engine 42 of i-document creation module 40, as described above with reference to FIG. 3.

At step 140, i-template 12 is customized and/or personalized to create i-doc 14. In one exemplary embodiment, i-template 12 is customized by modifying a format of i-template 12 such as a page layout and/or a font of i-template 12. I-template 12 is modified, for example, by i-document creation module 40, as described above with reference to FIG. 3.

At step 150, i-template 12 is further customized and/or personalized by merging variable data 45 such as text, an image, and/or a calculation with i-template 12 to create i-doc 14. In one exemplary embodiment, i-template 12 is modified to accommodate variable data 45. As such, modifying the format of i-template 12 includes, for example, modifying a size, resolution, and/or orientation of the image merged with i-template 12 to create i-doc 14.

At step 160, a hard copy and/or an electronic copy of customized/personalized document 16 is produced based on i-doc 14. A hard copy of customized/personalized document 16 is produced, for example, by printing and finishing system 52 of document production module 50.

Figure 6:
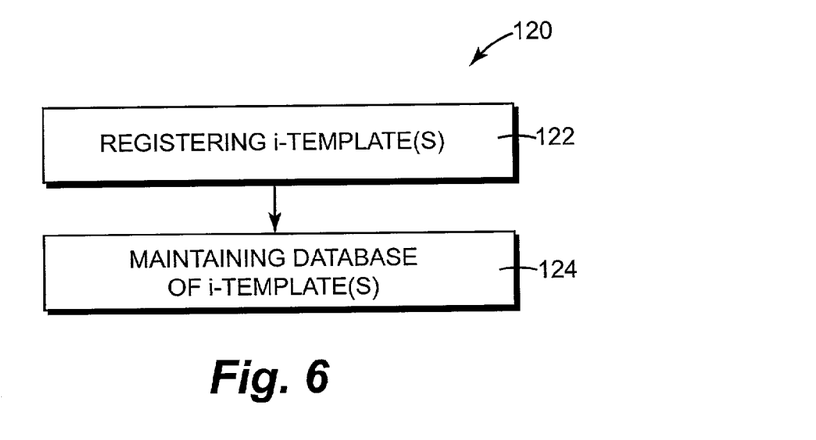
FIG. 6 is a flow diagram illustrating one exemplary embodiment of enabling use of an intelligent template in the method of FIG. 5.

In one exemplary embodiment, as illustrated in FIG. 6, enabling use of i-template 12 in step 120 includes registering of i-template 12, as indicated in step 122, and maintaining a database including i-template 12, as indicated in step 124. I-template 12 is enabled and maintained by file management system 32 and i-template database 34 of i-template enablement module 30, as described above.

In one exemplary embodiment, steps 110–160, including steps 122–124, of method 100 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

Figure 7:
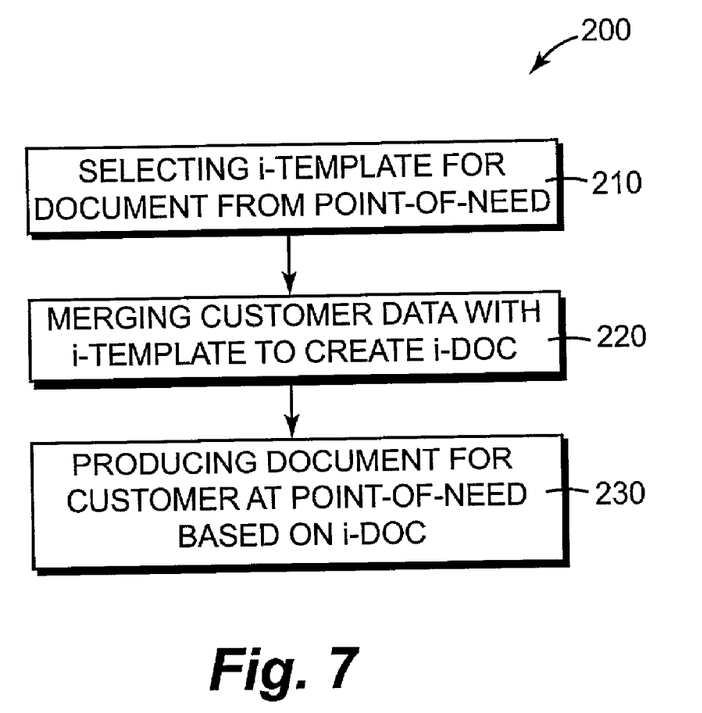
FIG. 7 is a flow diagram illustrating one exemplary embodiment of a method of producing a document for a customer at a point-of-need.

In FIG. 7, a flow diagram illustrating one exemplary embodiment of a method of producing customized/personalized document 16 for customer 64 at the point-of-need according to the present invention is illustrated generally at 200. Reference is also made to FIGS. 1–4. As described above, production of customized/personalized document 16 for customer 64 may be initiated by user 62 on behalf of customer 64 as well as directly by customer 64.

At step 210, i-template 12 for customized/personalized document 16 is selected from the point-of-need. I-template 12 is selected, for example, by submitting query 44 to i-template enablement module 30 and searching i-template database 34. As such, i-template 12 is selected and downloaded from i-template enablement module 30, as described above with reference to FIG. 3.

At step 220, customer data 65 of customer 64 is merged with i-template 12 to create i-doc 14. Customer data 65 is merged with i-template 12 by, for example, document customization/personalization tool 43 of i-document creation module 40. In one exemplary embodiment, customer data 65 is merged with i-template 12 by filling variable data fields 13 of i-template 12, as described above and illustrated, for example, in FIG. 4.

At step 230, customized/personalized document 16 for customer 64 is produced at the point-of-need based on i-doc 14. More specifically, a hard copy and/or an electronic copy of customized/personalized document 16 is produced by document production module 50, as described above with reference to FIG. 3.

Figure 8:
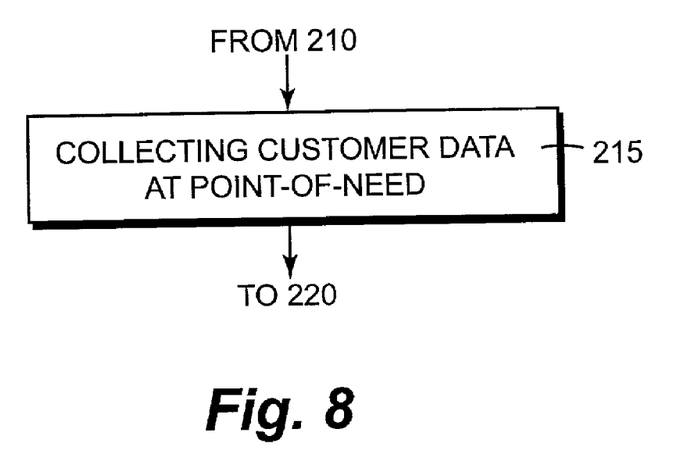
FIG. 8 is a flow diagram illustrating another exemplary embodiment of a portion of the method of FIG. 7.

In one exemplary embodiment, as illustrated in FIG. 8, producing customized/personalized document 16 for customer 64 in method 200 includes collecting customer data 65 from customer 64 at the point-of-need, as indicated in step 215. As such, customer data 65 collected at the point-of-need is merged with i-template 12 in step 220 to create i-doc 14. In one exemplary embodiment, customer data 65, as a form of variable data 45, is stored in variable data database 46.

In one exemplary embodiment, steps 210–230, including step 215, of method 200 are performed via computer-executable instructions of a computer-readable medium. Computer-readable medium, as used herein, is defined to include any kind of computer memory such as a floppy disk, conventional hard disk, CD-ROM, Flash ROM, non-volatile ROM, RAM, etc.

In one illustrative embodiment, document production system 10 is used by user 62 to create customized and/or personalized marketing material or communication for customer 64. As such, user 62 includes, for example, a sales representative interacting with customer 64. Thus, the sales representative selects i-template 12, as designed, for example, by designer 60 associated with the sales representative, and customizes and/or personalizes i-template 12 to create customized/personalized document 16 for customer 64.

The sales representative customizes and/or personalizes i-template 12 by collecting and merging customer data 65 of customer 64 and/or other variable data 45 with i-template 12 via document customization/personalization tool 43. As such, i-doc 14 is created by i-document creation module 40 with interaction by the sales representative. Thus, customized/personalized document 16 is produced for customer 64 at the point-of-need based on i-doc 14.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer-implemented method of producing a document for a customer at a point-of-need, the method comprising:
   selecting an intelligent template for the document from the point-of-need, the intelligent template including at least one variable data field;
   merging data of the customer with the intelligent template for the document to create an intelligent document, including filling the at least one variable data field based on the data of the customer and adjusting the at least one variable data field to accommodate the data of the customer; and
   producing the document for the customer at the point-of-need based on the intelligent document.

2. The method of claim 1, wherein selecting the intelligent template for the document includes searching a database including a plurality of intelligent templates.

3. The method of claim 2, wherein the database including the plurality of intelligent templates is located remote from the point-of-need.

4. The method of claim 3, further comprising:
   linking the point-of-need and the database including the plurality of intelligent templates via a communication network, wherein selecting the intelligent template for the document from the point-of-need includes searching the database from the point-of-need via the communication network and transferring the intelligent template for the document from the database to the point-of-need via the communication network.

5. The method of claim 1, further comprising:
   collecting the data of the customer at the point-of-need.

6. The method of claim 5, wherein collecting the data of the customer includes storing the data of the customer.

7. The method of claim 5, wherein the data of the customer includes at least one of an identification of the customer, input of the customer, a specification of the customer, and a selection by the customer.

8. The method of claim 1, wherein producing the document for the customer at the point-of-need includes creating at least one of a hard copy and an electronic copy of the document for the customer at the point-of-need.

9. The method of claim 8, wherein producing the document for the customer at the point-of-need includes creating the hard copy of the document, wherein creating the hard copy of the document includes printing and finishing the document for the customer at the point-of-need.

10. A computer-readable medium having computer-executable instructions for performing a computer-implemented method of producing a document for a customer at a point-of-need, the method comprising:
  selecting an intelligent template for the document from the point-of-need, the inteligent template including at least one variable data field;
  merging data of the customer with the intelligent template for the document to create an intelligent document, including filling the at least one variable data field based on the data of the customer and adjusting the at least one variable data field to accommodate the data of the customer; and
  producing the document for the customer at the point-of-need based on the intelligent document.

11. The computer-readable medium of claim 10, wherein the method further comprises:
  collecting the data of the customer at the point-of-need.

12. A computer-implemented system for producing a document for a customer at a point-of-need, the system comprising:
  an intelligent template enablement module accessed from the point-of-need, wherein the intelligent template enablement module facilitates selection of an intelligent template for the document from the point-of-need;
  an intelligent document creation module accessed from the point-of-need and associated with the intelligent template enablement module, wherein the intelligent document creation module is adapted to merge data of the customer with the intelligent template for the document to create an intelligent document; and
  a document production module located at the point-of-need and associated with the intelligent document creation module, wherein the document production module is adapted to produce the document for the customer at the point-of-need based on the intelligent document
  wherein the intelligent template for the document includes at least one variable data field, wherein the intelligent document creation module is adapted to fill the at least one variable data field based on the data of the customer and adjust the at least one variable data field to accommodate the data of the customer.

13. The system of claim 12, wherein the intelligent template enablement module includes a database including a plurality of intelligent templates, wherein the intelligent template for the document is selected from the plurality of intelligent templates.

14. The system of claim 13, wherein the database including the plurality of intelligent templates is located remote from the point-of-need.

15. The system of claim 14, further comprising:
  a communication network configured to link the point-of-need and the database including the plurality of intelligent templates, wherein the intelligent template for the document is selected from the plurality of intelligent templates from the point-of-need via the communication network.

16. The system of claim 12, wherein the intelligent document creation module is adapted to collect the data of the customer at the point-of-need.

17. The system of claim 16, wherein the intelligent document creation module is adapted to store the data of the customer.

18. The system of claim 16, wherein the data of the customer includes at least one of an identification of the customer, input of the customer, a specification of the customer, and a selection by the customer.

19. The system of claim 12, wherein the document production module is adapted to create at least one of a hard copy and an electronic copy of the document for the customer at the point-of-need.

20. The system of claim 19, wherein the document production module is adapted to create the hard copy of the document, wherein the document production module is adapted to print and finish the document for the customer at the point-of-need.

* * * * *

UNITED STATES PATENT AND TRADEMARK OFFICE
CERTIFICATE OF CORRECTION

| | | |
|---|---|---|
| PATENT NO. | : 7,024,620 B2 | Page 1 of 1 |
| APPLICATION NO. | : 10/093627 | |
| DATED | : April 4, 2006 | |
| INVENTOR(S) | : Rafael Antonio Martinez Ponce et al. | |

It is certified that error appears in the above-identified patent and that said Letters Patent is hereby corrected as shown below:

In column 9, line 21, in Claim 10, delete "inteligent" and insert -- intelligent --, therefor.

Signed and Sealed this

Eleventh Day of August, 2009

David J. Kappos
*Director of the United States Patent and Trademark Office*